(12) United States Patent
Broesamle et al.

(10) Patent No.: US 9,046,037 B2
(45) Date of Patent: Jun. 2, 2015

(54) METHOD FOR OPERATING A COMBINED CYCLE POWER PLANT

(71) Applicant: ALSTOM Technology Ltd., Baden (CH)

(72) Inventors: Stefan Eduard Broesamle, Windisch (CH); Christoph Ruchti, Uster (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 13/714,568

(22) Filed: Dec. 14, 2012

(65) Prior Publication Data

US 2013/0160424 A1    Jun. 27, 2013

(30) Foreign Application Priority Data

Dec. 22, 2011 (CH) ...................................... 2024/11

(51) Int. Cl.
*F02C 1/00* (2006.01)
*F02C 6/00* (2006.01)
(Continued)

(52) U.S. Cl.
CPC .................. *F02C 7/185* (2013.01); *F01K 23/10* (2013.01); *F02C 9/18* (2013.01); *F01K 23/02* (2013.01); *Y02E 20/16* (2013.01); *F01D 19/00* (2013.01); *F05D 2260/2322* (2013.01); *F02C 6/18* (2013.01); *F02C 7/141* (2013.01); *F05D 2260/213* (2013.01)

(58) Field of Classification Search
CPC ....... F01K 23/10; F01K 23/106; Y02E 20/16; F02C 6/18; F02C 7/185; F02C 7/18; Y02T 50/675

USPC ...................... 60/39.182, 39.5, 772, 782, 806
See application file for complete search history.

(56) References Cited

U.S. PATENT DOCUMENTS 2,717,491 A * 9/1955 Barr ................................ 60/785
4,767,259 A * 8/1988 Kurosawa et al. .............. 415/17
(Continued)

FOREIGN PATENT DOCUMENTS

DE        4333439        2/1995
EP        0709561        5/1996
(Continued)

OTHER PUBLICATIONS

Search Report for Swiss Patent App. No. 02024/2011 (Jun. 29, 2012).
(Continued)

*Primary Examiner* — Gerald L Sung
(74) *Attorney, Agent, or Firm* — Buchanan Ingersoll & Rooney PC (57) ABSTRACT

A method for operating a combined cycle power plant is disclosed, which has a gas turbine installation and a water-steam cycle connected to the gas turbine installation by a waste heat steam generator and has at least one steam turbine, the gas turbine installation includes a compressor, a combustion chamber, and a turbine. To cool the turbine, air compressed at the compressor is removed, cooled in at least one cooler flowed through by water, thus generating steam, and introduced into the turbine. At least with the gas turbine installation running, prior to or during the start-up of the water-steam cycle, waste heat, which is contained in the steam generated in the at least one cooler, is used to good effect for pre-heating the installation inside the combined cycle power plant.

14 Claims, 5 Drawing Sheets

(51) Int. Cl.
*F02C 7/18* (2006.01)
*F01K 23/10* (2006.01)
*F02C 9/18* (2006.01)
*F01K 23/02* (2006.01)
*F01D 19/00* (2006.01)
*F02C 6/18* (2006.01)
*F02C 7/141* (2006.01)

(56) References Cited

U.S. PATENT DOCUMENTS

| | | | | |
|---|---|---|---|---|
| 5,661,968 | A * | 9/1997 | Gabriel | 60/39.182 |
| 6,363,710 | B1 * | 4/2002 | Gebke et al. | 60/39.182 |
| 7,032,373 | B2 * | 4/2006 | Franke et al. | 60/39.182 |
| 2009/0064656 | A1 | 3/2009 | Oomens et al. | |
| 2009/0235634 | A1 * | 9/2009 | Wang et al. | 60/39.182 |
| 2011/0088404 | A1 * | 4/2011 | Gulen | 60/772 |
| 2012/0167546 | A1 * | 7/2012 | Oomens et al. | 60/39.182 |

FOREIGN PATENT DOCUMENTS

| | | |
|---|---|---|
| EP | 1154127 | 11/2001 |
| EP | 1262638 | 12/2002 |
| JP | 2002-070506 A | 3/2002 |
| JP | 2006-509942 A | 3/2006 |

OTHER PUBLICATIONS

Office Action (Notification of Reasons for Refusal) issued Dec. 15, 2014 in Japanese Patent Application No. 2012-279250, and an English translation thereof.

* cited by examiner

METHOD FOR OPERATING A COMBINED CYCLE POWER PLANT

This application claims priority under 35 U.S.C. §119 to Swiss application no. 02024/11, filed 22 Dec. 2011, the entirety of which is incorporated by reference herein.

BACKGROUND

1. Field of Endeavor

The present invention refers to the area of power plant technology. It relates to a method for operating a combined cycle power plant, and to a combined cycle power plant useful for carrying out the method.

2. Brief Description of the Related Art

Figure 1:
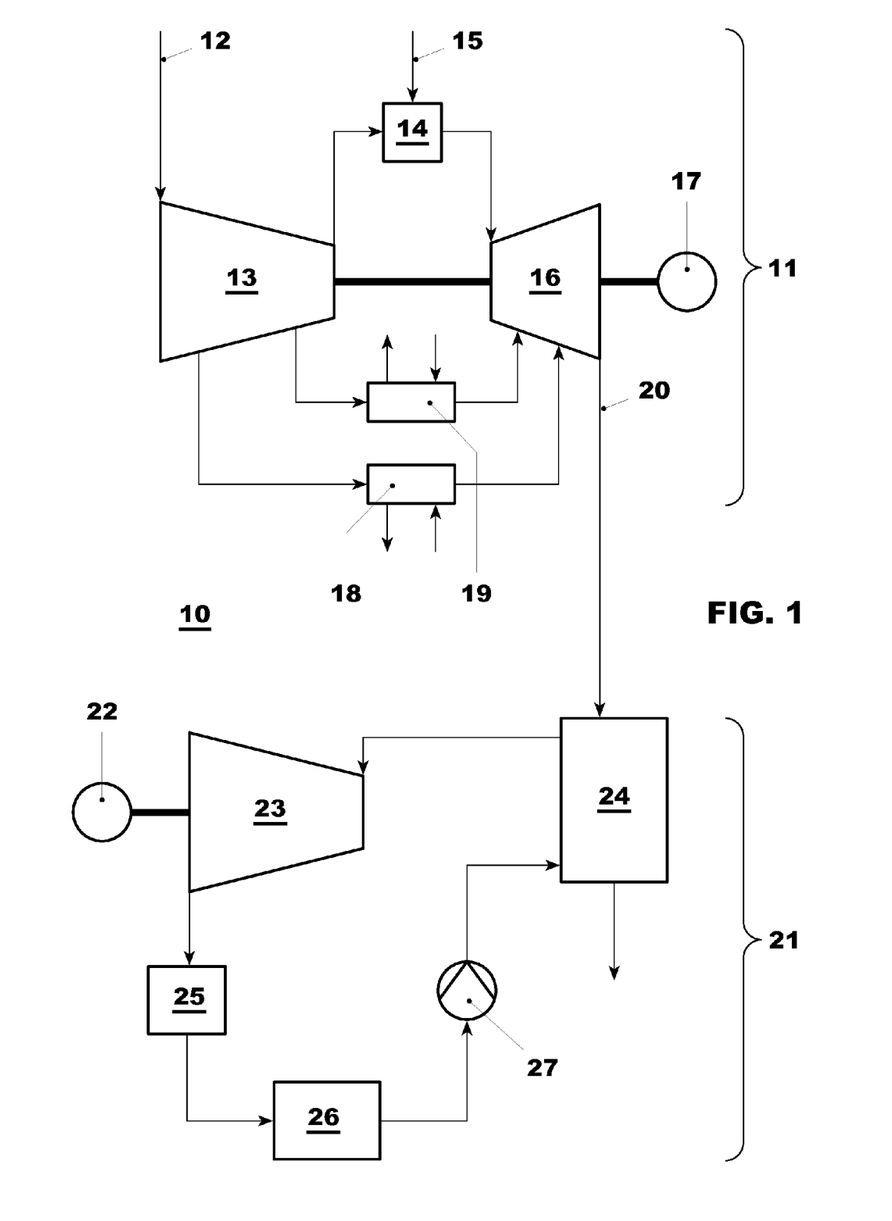
FIG. 1 shows the greatly simplified diagram of a combined cycle power plant, as is suitable for carrying out the invention, with the addition that the DT shaft glands are acted upon with sealing steam.

The present invention relates to a combined cycle power plant, such as is shown in a schematic manner as an example and greatly simplified in FIG. 1. The combined cycle power plant 10 of FIG. 1 includes a gas turbine installation 11 as well as a water-steam cycle 21 which is connected thereto.

The gas turbine installation 11 includes, in its simplest form, a compressor 13, which sucks in air via an air inlet 12 and compresses it and outputs the compressed air to a combustion chamber 14 downstream, where it is used to burn a fuel 15. The hot gas generated in the combustion chamber is expanded in a turbine 16 downstream under operating load (in the case of sequential combustion, several combustion chambers and turbines can also be present). The compressor 13 and the turbine 16 are usually arranged on a common rotor shaft which drives a generator 17 to generate electric energy. To cool the parts of the turbine 16 that are highly loaded thermally, air compressed at the compressor 13 (in the example in FIG. 1 at two different positions) is drawn off, cooled in associated coolers 18 or 19 and supplied to the turbine 16. The coolers 18, 19 are in the majority of cases realized as OTC coolers (Once Through Cooler) and are fed with water.

The exhaust gas 20 emerging from the turbine 16 is sent through a waste heat steam generator 24 which is arranged in the water-steam cycle 21 and there brings about the evaporation and super-heating of the water circulating in the water-steam cycle 21. The steam generated in the waste heat steam generator 24 is expanded in a steam turbine 23 under operating load and drives a generator 22 which is connected to the steam turbine 23. The steam turbine 23 can also be coupled directly to the gas turbine, a common generator being driven. The steam emerging from the steam turbine 23 is condensed in a condenser 25 and passes as condensation into a feedwater tank 26, from where a feedwater pump 27 conveys the water again to the waste heat steam generator 24 thus closing the cycle.

During cooling of the compressed air, drawn off at the compressor 13, in the coolers 18 and 19, the water allocated to the coolers 18, 19 is evaporated. If, instead of the combined cycle, the combined cycle power plant 10 is operated only as a simple cycle, where only the gas turbine installation 11 is operating and where the water-steam cycle 21 is not operating, the steam arising in the coolers 18, 19 has to be discharged in some way or other. This occurs up to now either by it being blown off into the atmosphere (e.g., by a secondary stack provided for the simple cycle), or by it being condensed in a condenser and being returned into the cycle. However, it can also be injected into the gas turbine to increase performance.

It would, however, be desirable to use the steam arising during the cooling of the cooling air to better effect. In particular, the transition from simple cycle operation to combined cycle operation might be considered for this when installation parts of the water-steam cycle which have been cooled (over several days) have to be preheated in order to reduce thermal stresses and/or to accelerate the start-up process.

U.S. Pat. No. 5,473,898 A has made known, when starting the combined cycle in a combined cycle power plant, preheating the steam turbine and the waste heat steam generator with hot air which is removed from the compressor. In this case, cooling the compressed air for cooling purposes does not take place.

U.S. Patent App. Pub. No. 2009/0301078 A1 proposes integrating the waste heat which occurs when cooling compressed air into the water-steam cycle of a combined cycle power plant via the waste heat steam generator. This type of operation, however, is only possible if the installation is already operating in the combined cycle.

SUMMARY

One of numerous aspects of the present invention includes a method for operating a combined cycle power plant, which, with the gas turbine installation running, prior to or during the start-up of the combined process, provides a use to good effect of the waste heat occurring during the cooling of the cooling air. Another aspect includes a combined cycle plant useful to carry out such a method.

Another aspect includes a combined cycle power plant, which has a gas turbine installation and a water-steam cycle, which is connected to the gas turbine installation by a waste heat steam generator, and has at least one steam turbine, wherein the gas turbine installation includes a compressor, a combustion chamber and a turbine, and wherein, to cool the turbine, air compressed at the compressor is removed, is cooled in at least one cooler flowed through by water thus generating steam and is introduced into the turbine. In such a method, with the gas turbine installation running, prior to or during the start-up of the water-steam cycle, the waste heat which is contained in the steam generated in the at least one cooler is used to good effect inside the combined cycle power plant.

A first development of the method is characterized in that the waste heat is used to preheat the feedwater used in the at least one cooler.

In particular, the preheated feedwater is used to preheat the fuel used in the gas turbine installation.

In another development, the waste heat is used to preheat the waste heat steam generator.

A further development is characterized in that the waste heat in the waste heat steam generator is used to preheat the super heater and the evaporator.

It is particularly advantageous when the condensation occurring during the preheating of the waste heat steam generator is discharged from the superheaters of the waste heat steam generator.

Another development includes that the waste heat is used to preheat the steam turbine.

In particular in this case, both the housing and the rotor of the steam turbine can be preheated by feeding in steam at a suitable position.

A further aspect includes that the water-steam cycle includes means for condensing the steam emerging from the steam turbine, it being possible for this steam also to be used as sealing steam in the case of the steam turbine as soon as the condenser is under vacuum, and that the steam generated in the at least one cooler is used to evacuate the condensation means.

Another aspect includes a combined cycle power plant that includes a gas turbine installation and a water-steam cycle which is connected to the gas turbine installation by a waste heat steam generator and has at least one steam turbine, wherein the gas turbine installation includes a compressor, a combustion chamber and a turbine, and wherein, to cool the turbine, air compressed at the compressor is removed, is cooled in at least one cooler flowed through by water, thus generating steam, and is introduced into the turbine. The water-steam cycle is connected with the at least one cooler by at least one additional steam line.

According to one development of the combined cycle power plant, a first steam line is guided from the at least one cooler to the waste heat steam generator.

In particular, the waste heat steam generator includes a steam drum and a super heater, wherein the first steam line is guided to the steam drum and to the super heater in each case via a valve.

The waste heat steam generator can also be a "Once Through" steam generator, which includes a bottle as the moisture separator in place of the drum, as can be seen in FIG. 2A.

Another development is characterized in that a second steam line is guided from the at least one cooler to the steam turbine via a valve.

A further development is distinguished in that the water-steam cycle includes means for condensing the steam emerging from the steam turbine, which condensation means are operated under vacuum, and that a third steam line is guided from the at least one cooler via a valve to an evacuation apparatus which is connected to the condensation means.

The term 'condenser under vacuum' refers to the fact that the steam turbine has to be "sealed", i.e., it must be acted upon with sealing steam. In addition, sealing damp is also guided to the steam turbine or rather the steam turbine labyrinths.

Another development is characterized in that the at least one cooler is connected to a feedwater tank (feedwater container and preheater/degasser) for supplying water, and that a fourth steam line from the cooler can be returned to the feedwater boiler via a valve.

Yet another development is characterized in that a secondary stack, which is connected to a valve by which the steam generated in the at least one cooler is discharged, is arranged between the gas turbine installation and the waste heat steam generator.

Further advantages of methods and systems described herein can be seen in that the circuit is suited:

a) To preheating the waste heat steam generator, in particular under cold start conditions (after a stoppage of several days); in this case, steam is output onto the super heater and evaporator in the waste heat steam generator for a predetermined time in order to warm up said parts; condensation forming at the same time is discharged such that the waste heat steam generator cannot fill with condensation over a longer period; the load caused by the hot exhaust gas of the gas turbine in the case of certain strongly thermally loaded components in the waste heat steam generator is drastically reduced through the preheating.

b) To preheat the steam turbine, in particular under cold start conditions, for example after a stoppage of several days; through the preheating, the housing and also the rotor, alternatively or accumulatively, are able to be heated up in a gentler manner and the run-up is able to be effected in a shorter time; over and above this, the service life of the components is less strongly affected.

c) To preheat the steam turbine and in addition to preheat the live-steam lines of HRSG and DT.

d) To ensure a combination from the preceding preheating sequences in continuous mode, namely:
  a) and/or b)
  a) and/or c)
  b) and/or c)
  a) and/or b) and/or c)

e) The steam from the OTC coolers can be used for (initial) evacuation of the condenser and/or for acting on the steam turbine with sealing steam for certain installation parts at the start; at the transition from simple cycle to combined cycle (i.e., when starting up the condensation apparatus, for example of a surface condenser or air-cooled condenser ACC), this measure shortens the waiting time until reaching a sufficient vacuum in the installation parts.

f) The steam can be used for preheating the feedwater for the OTC cooler; the feedwater can additionally be used in order to preheat the fuel for the gas turbine in order to improve the efficiency of the gas turbine process overall.

g) After converting from combined cycle to simple cycle, the steam turbine and steam turbine condenser can be kept under vacuum. This reduces the extent of stoppage corrosion which is caused by condensation of the residual steam during cooling.

BRIEF DESCRIPTION OF THE DRAWINGS

The invention is to be explained below by way of exemplary embodiments in conjunction with the drawing, in which, in more detail.

DETAILED DESCRIPTION OF EXEMPLARY EMBODIMENTS

The description below involves the use of the waste heat, which arises in the case of the cooling system of the gas turbine of a combined cycle power plant (in particular in the case of the OTC type cooling air coolers), for the preparation of the combined cycle, when said cooling system is to be run up from the cold state with a gas turbine installation running. By preparing the waste heat steam generator, the steam turbine, the evacuation system and other installation parts in this way (thermally), the load placed on the components by thermal stresses is minimized and consequently the service life thereof is lengthened.

In particular, the waste heat or the steam, which arises when the cooling air removed from the compressor is being cooled, during or prior to the transition from the simple cycle to the combined cycle, is to be used to good effect in the following manner:

a) To preheat the waste heat steam generator, in particular under cold start conditions (after a stoppage of several days); in this case, steam is output onto the super heater and evaporator in the waste heat steam generator for a predetermined time in order to warm up these parts; condensation forming at the same time is discharged such that the waste heat steam generator cannot fill with condensation over a longer period; the load caused by the hot exhaust gas of the gas turbine in the case of certain strongly thermally loaded components in the waste heat steam generator is drastically reduced through the preheating.

b) To preheat the steam turbine, in particular under cold start conditions (after a stoppage of several days); the housing and also the rotor are able to be heated up in a gentler manner and the run-up is able to be effected in a shorter time through the preheating. Over and above this, the service life of the components is less strongly affected. At the same time, the evacuation of the condenser must be ensured and all the labyrinths of the steam turbine are preferably sealed.

c) To preheat the steam turbine and, in addition, to preheat the live-steam lines of HRSG and DT.

d) To ensure a combination from the preceding preheating sequences in continuous mode, namely:
1. a) and/or b)
2. a) and/or c)
3. b) and/or c)
4. a) and/or b) and/or c)

e) The steam from the OTC coolers can be used for (initial) evacuation of the condenser and/or for acting on the steam turbine with sealing damp on certain installation parts at the start; at the transition from simple cycle to combined cycle (i.e., when starting up the condensation apparatus, for example of a surface condenser or air-cooled condenser ACC), this measure shortens the waiting time until reaching a sufficient vacuum in said installation parts.

f) The steam can be used for preheating the feedwater for the OTC cooler; the feedwater can additionally be used in order to preheat the fuel for the gas turbine in order to improve the efficiency of the gas turbine process overall.

g) After converting from combined cycle to simple cycle, the steam turbine and steam turbine condensers can be switched under vacuum. This reduces the extent of stoppage corrosion which is caused by condensation of the residual steam during cooling.

Figure 2:
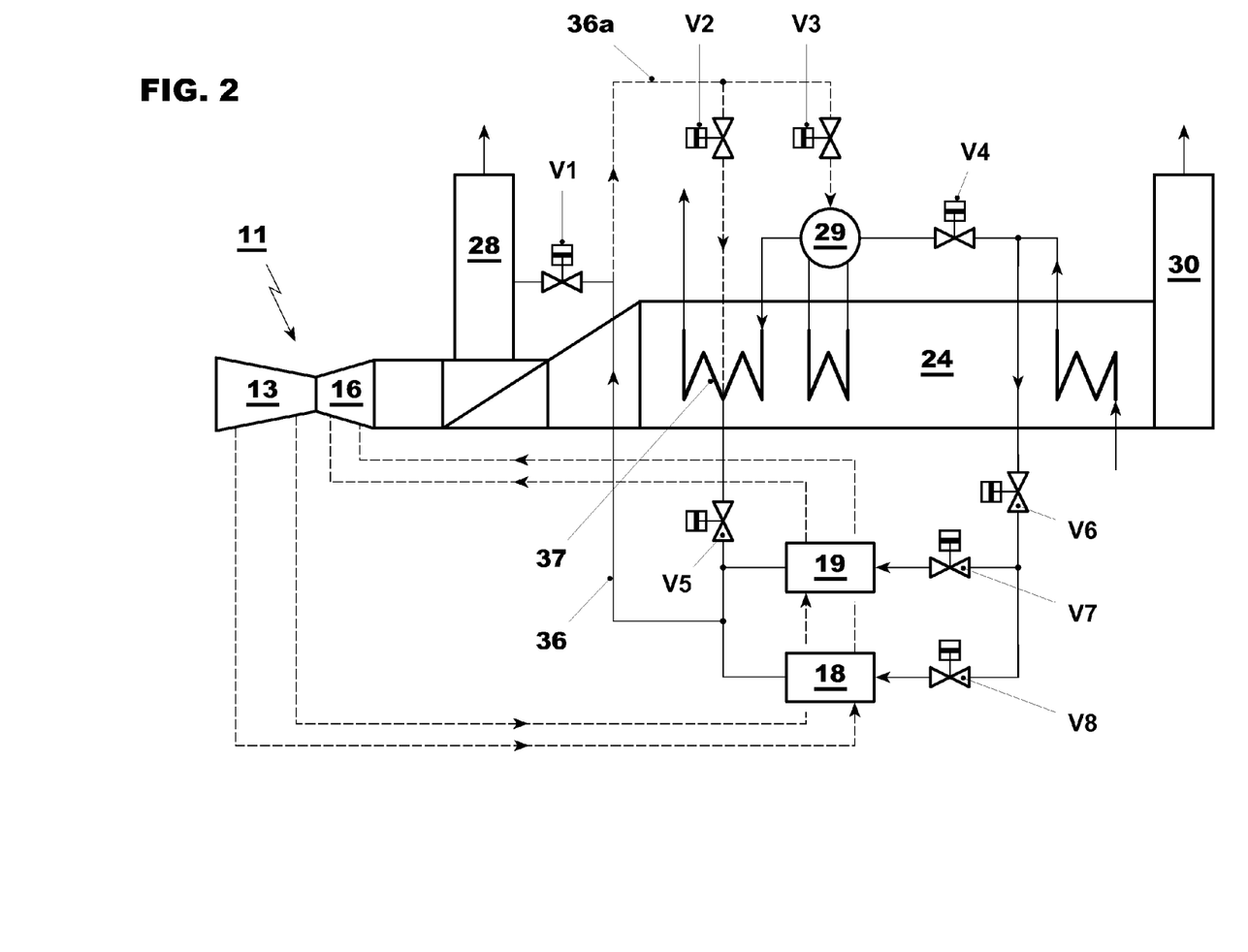
FIG. 2 shows part of an installation diagram of a combined cycle power plant where, according to a first exemplary embodiment of the invention, preheating of the waste heat steam generator is provided by the waste heat that arises during the cooling of the cooling air.

FIG. 2 shows part of an installation diagram of a combined cycle power plant where, according to a first exemplary embodiment, preheating of the waste heat steam generator is provided by the waste heat that arises during the cooling of the cooling air. The gas turbine with the compressor 13 and the turbine 16 as well as the waste heat steam generator downstream 24 with the main stack 30 are located in the center of the representation in FIG. 2. Compressed air (at different pressure levels) is removed at the compressor 13, for example at two positions, and is cooled in coolers 18 or 19. The cooled pressurized air is then supplied to the turbine 16 for the purposes of cooling (see broken lines in FIG. 2). The installation also has a secondary stack 28 which permits operation of the installation in terms of FIG. 2-4. The installation is thus able to be operated in open cycle, i.e., without a steam turbine, the steam generated in the GT coolers being able to be condensed either in the secondary stack 28 or in a special air-cooled condenser.

To cool the cooling air, the coolers 18 and 19 are operated according to the OTC principle with water, which is removed at the waste heat steam generator 24 after preheating and prior to entry into the steam drum 29 and is guided via valves V6-V8 to the inlets of the coolers 18 and 19. The steam appearing at the outlet of the coolers 18 and 19 can be output in the normal operation of the combined cycle to the super heater 37 in the waste heat steam generator 24 via the valve V5. In addition, there is the possibility (known per se) of blowing off the steam into the atmosphere via the valve V1 and a secondary stack 28 which is arranged between the gas turbine and the waste heat steam generator.

The new possibility according to FIG. 2, whilst the gas turbine installation is operating in simple cycle, is now to use the steam 36 generated in the coolers 18 and 19 via the steam line 36a (shown by the broken line) and the valves V2 and V3 to preheat the steam lines of the super heater 37 or of the steam drum 29 or rather the moisture separator and of the evaporator connected thereto. In this way, for preparation at the start of the combined cycle, essential parts of the waste heat steam generator 24 can be preheated and consequently the thermal stresses in the waste heat steam generator 24 are clearly reduced.

Figure 3A:
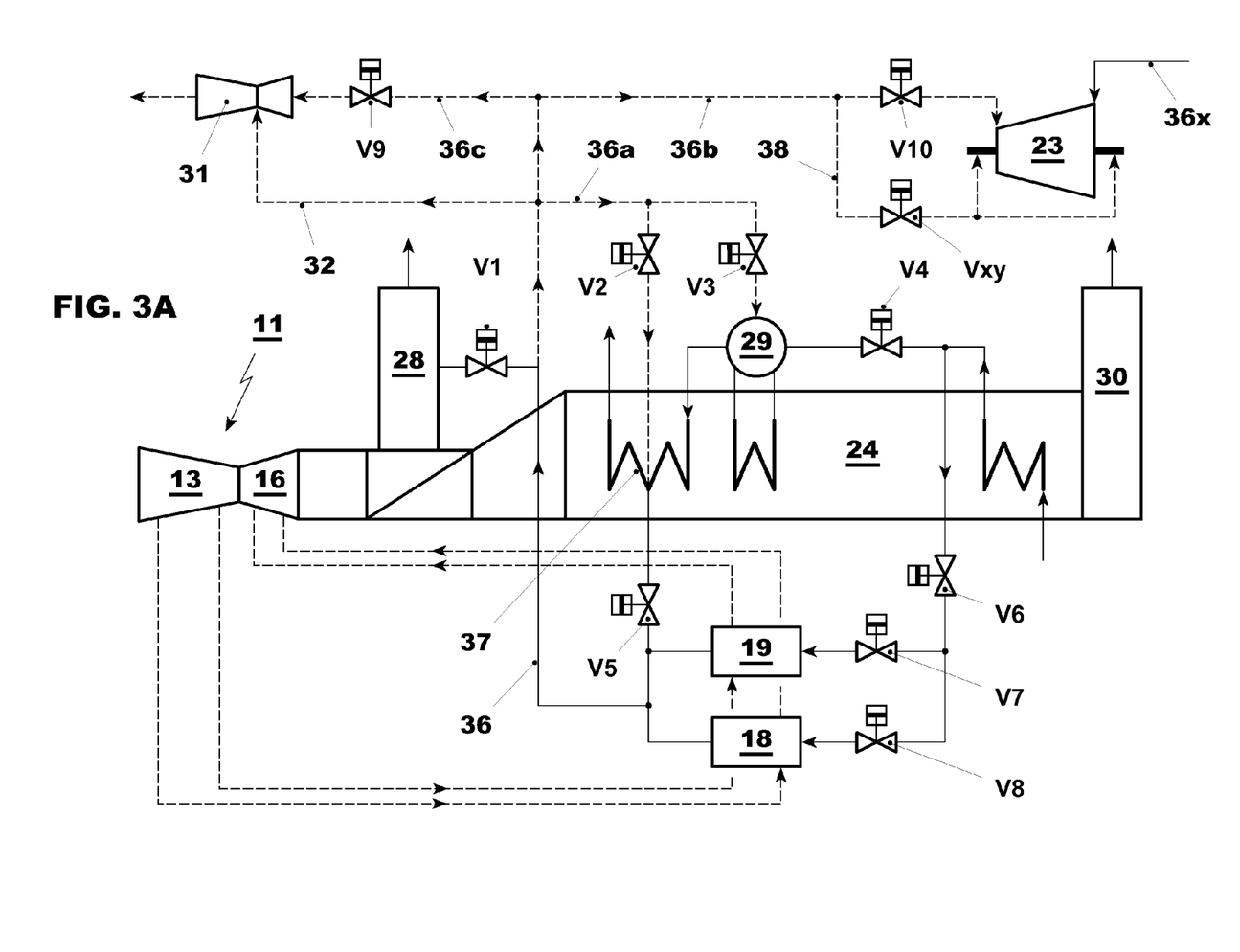
FIG. 3A shows part of an installation diagram of a combined cycle power plant, according to FIG. 2, with the inclusion of a drum boiler.

Other possibilities for using the steam 36 that arises in the coolers 18 and 19 to good effect are shown in FIG. 3A. First of all, part of the steam 36 generated in the coolers 18 and 19 is used to preheat the steam lines of the super heater 37 or of the steam drum 29 or rather the moisture separator and of the evaporator connected thereto via the steam line 36a (shown by the broken line) and the valves V2 and V3. A further part of the steam 36 can, in this case, preheat the steam turbine 23 (housing and rotor) via the steam line 36b (shown by the broken line) and the valve V10 in order to reduce the thermal stresses in an effective manner when starting the water-steam cycle.

However, it is also conceivable, as an alternative to this or in addition to it, to operate an evacuation apparatus in the form of a steam injector 31 via the steam line 36c (shown by a broken line) and the valve V9 in order to pump off or evacuate the condensation device of the water-steam cycle via an intake line 32. In addition, the steam turbine can already be sealed such that no air is sucked into the steam turbine 23. In this case, the time up to achieving the necessary vacuum for the operation of the combined cycle can be clearly reduced. In addition, the sealing steam for acting on the DT shaft glands can be made ready via a steam line 38, which branches off in front of the valve V10 in the steam line 36b, via a further valve Vxy. A further line 36x is shown, feeding in the steam for the preheating of the steam turbine 23. The location for feeding in steam shown here is only to be understood in a qualitative manner; in general it holds that such feeding-in is performed at a suitable position in the steam turbine 23. It is clear in this case that the measures shown in FIG. 2 and FIG. 3A can be taken selectively in an alternative or accumulative manner.

Figure 3B:
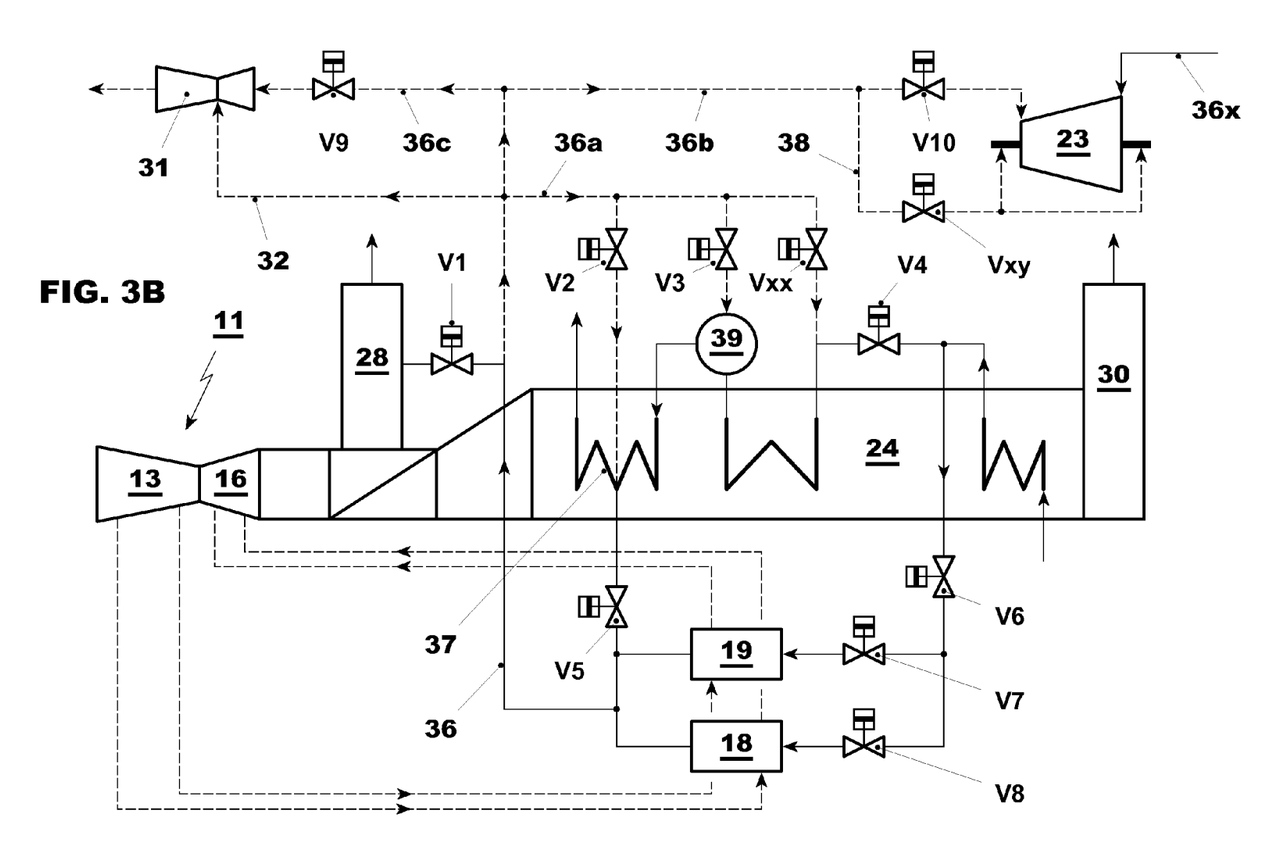
FIG. 3B shows part of an installation diagram of a combined cycle power plant, according to FIG. 2, with the inclusion of a single pipe boiler with a moisture separator

Further possibilities to use the steam 36 that arises in the coolers 18 and 19 to good effect are shown in FIG. 3B. First of all, part of the steam 36 generated in the coolers 18 and 19 is used via the steam line 36a (shown by the broken line) and the valves V2 and V3 to preheat the steam lines of the super heater 37 or, in place of a steam drum according to FIG. 2A, a moisture separator 39 and the evaporator connected thereto. A further part of the steam 36 can in this case preheat the steam turbine 23 (housing and rotor) via the steam line 36b (shown by the broken line) and the valve V10 in order to reduce the thermal stresses in an effective manner when starting the water-steam cycle.

However, it is also conceivable, as an alternative to this or in addition to it, to operate an evacuation apparatus in the form of a steam injector 31 via the steam line 36c (shown by the broken line) and the valve V9 in order to pump off or evacuate the condensation device of the water-steam cycle via an intake line 32. In addition, the steam turbine can already be sealed such that no air is sucked into the steam turbine. In this case, the time up to achieving the necessary vacuum for the operation of the combined cycle can be clearly reduced. In addition, the sealing steam for acting on the DT shaft glands can be made ready via a steam line 38, which branches off in front of the valve V10 in the steam line 36b, via a further valve Vxy. A further circuit is possible here by the steam line 36a being continued after the branching-off to the moisture separator 39, the amount of steam conveyed by this continuation being supplied via a valve Vxx to the waste heat steam generator 24. A further line 36x is operatively connected to the steam turbine; reference is made to the designs in FIG. 3A. It is clear in this case that the measures shown in FIG. 2 and FIG. 3A and FIG. 3B can be taken selectively in an alternative or accumulative manner.

In principle, the steam 36 that arises in the coolers 18 and 19 can be used to good effect within a circuit that is simplified where required in relation to the preceding Figures. By using FIGS. 3A and 3B, the steam 36 that arises in the coolers will preheat the steam turbine 23 (housing and rotor) via a first steam line 36b (shown by the broken line) and the valve V10 in order to reduce the thermal stresses in an effective manner when starting the water-steam cycle.

Via a further steam line 36c (shown by the broken line) and the valve V9, an evacuation apparatus in the form of a steam injector 31 is operated in order to pump off or to evacuate the condensation device of the water-steam cycle 32 via an intake line 32. In addition, the steam turbine 23 can already be sealed such that no air can be sucked into the steam turbine. In this case, the time up to achieving the necessary vacuum for the operation of the combined cycle can be clearly reduced. It is clear in this case that the measures shown in FIG. 2 and FIG. 3A and FIG. 3B can be taken selectively in an alternative or accumulative manner.

Figure 4:
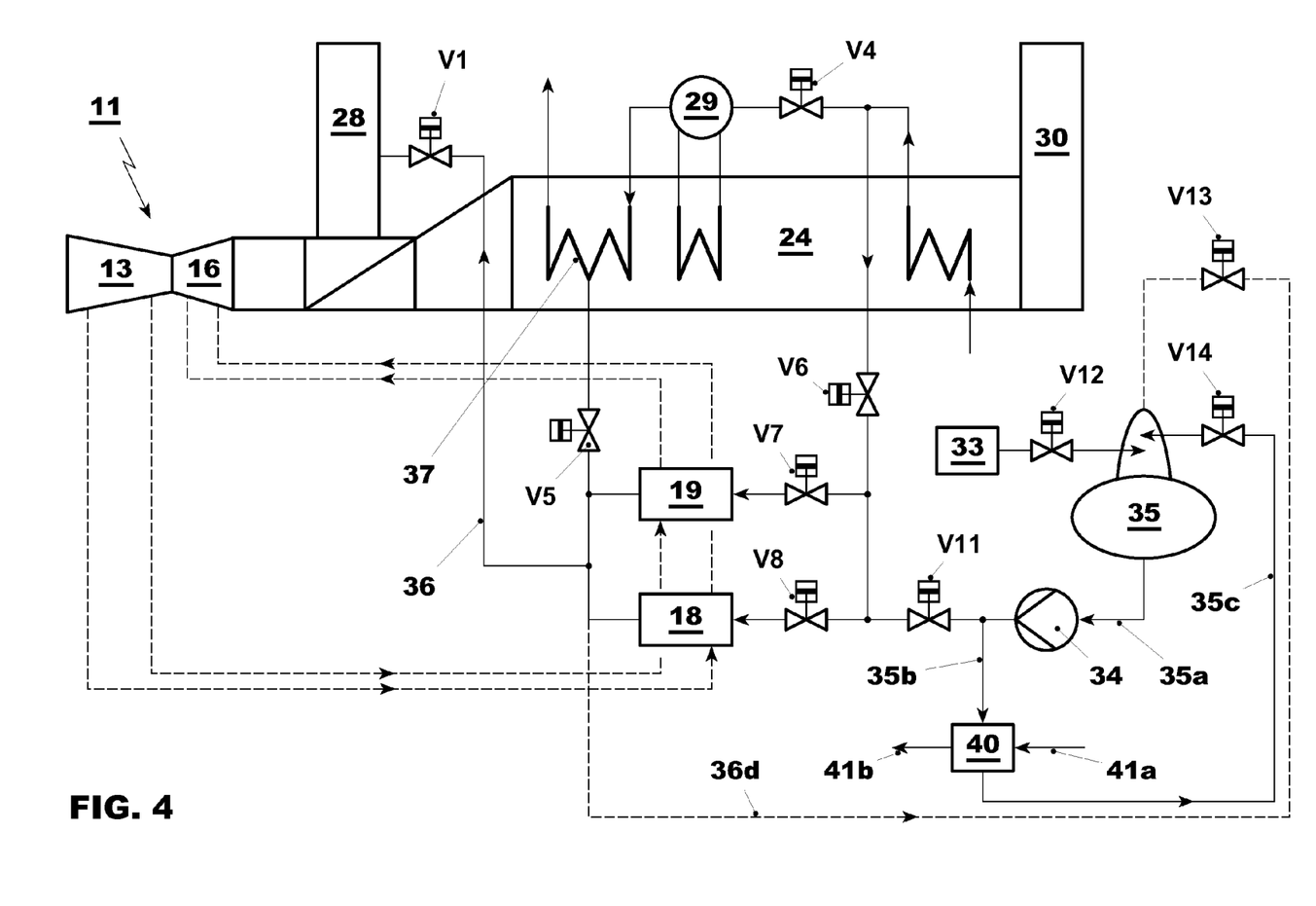
FIG. 4 shows part of an installation diagram of a combined cycle power plant where, according to a fourth exemplary embodiment of the invention, preheating of the feedwater is provided by the waste heat that arises during the cooling of the cooling air.

Finally, FIG. 4 shows a further possibility for using the steam or the waste heat from the coolers 18 and 19 to good effect. In this case, via a steam line 36e (shown by the broken line) and the valve V13, steam is introduced into a feedwater tank 35, from which feedwater 35a passes to the coolers 18 and 19 via the feedwater pump 34 and the valve V11. Water from a water treatment installation 33 can be supplied to the feedwater tank 35 at the same time via the valve V12. In this case, the circuit can be extended in an advantageous manner by a feedwater-conducting line 35b branching off downstream of the feedwater pump 34, feedwater 35b serving as a heat exchanger medium for a preheater 40 for burnable gas 41a/41b. The condensation 35c flowing out of the burnable gas preheater 40 is returned into the feedwater tank 35 via a valve V14.

LIST OF REFERENCES

10 Combined cycle power plant
11 Gas turbine installation
12 Air inlet
13 Compressor
14 Combustion chamber
15 Fuel
16 Turbine
17,22 Generator
18,19 Cooler (Once Through Cooler OTC)
20 Exhaust gas
21 Water-steam cycle
23 Steam turbine
24 Waste heat steam generator
25 Condenser
26,35 Feedwater tank
27,34 Feedwater pump
28 Secondary stack
29 Steam drum
30 Main stack
31 Steam injector
32 Intake line
33 Water treatment plant
34 Feedwater pump
35 Feedwater tank
35a-b Feedwater
36a-e Steam line for preheating the installation
36x Line for feeding in steam for preheating
37 Super heater
38 Sealing steam pressure acting on the DT shaft glands
39 Moisture separator
40 Burnable gas preheater
V1-V14, Vxy, Vxx Valve While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a combined cycle power plant, which plant has a gas turbine installation and a water-steam cycle, wherein the water-steam cycle is connected to the gas turbine installation by a waste heat steam generator and wherein the water-steam cycle includes at least one steam turbine and a condenser configured to condense the steam emerging from the at least one steam turbine, and wherein the condenser operates under vacuum, and wherein the gas turbine installation includes a compressor, a combustion chamber, and a turbine, and wherein, to cool the turbine of the gas turbine installation, air compressed at the compressor is removed, cooled in at least one cooler flowed through by water thus generating steam, and introduced into the turbine of the gas turbine installation, the method comprising:

at least with the gas turbine installation running, and prior to or during the start-up of the water-steam cycle, pre-heating at least a portion of the gas turbine installation at a position inside the combined cycle power plant with waste heat contained in the steam generated in the at least one cooler; and wherein the pre-heating at least a portion of the gas turbine installation includes evacuating the condenser with steam generated in the at least one cooler.

2. A method according to claim 1, wherein the combined cycle power plant includes means for blowing-off steam generated in the at least one cooler.

3. A method according to claim 2, further comprising:
blowing-off steam generated in the at least one cooler via a secondary stack.

4. A method according to claim 3, wherein blowing-off steam comprises blowing-off steam at the secondary stack between the gas turbine installation and the waste heat steam generator.

5. A method according to claim 1, further comprising:
condensing steam generated in the at least one cooler in a condenser.

6. A method according to claim 1, wherein preheating at least a portion of the gas turbine installation comprises:
preheating feedwater used in the at least one cooler with waste heat from the compressor of the gas turbine installation.

7. A method according to claim 6, wherein preheating at least a portion of the gas turbine installation comprises:
preheating fuel used in the gas turbine installation with preheated feedwater from said preheating feedwater step.

8. A method according to claim 1, wherein preheating at least a portion of the gas turbine installation comprises:
preheating the waste heat steam generator with waste heat from the compressor of the gas turbine installation.

9. A method according to claim 8, in which the waste heat steam generator includes a super heater and an evaporator, each including live-steam lines, and wherein said preheating the waste heat steam generator comprises preheating said live-steam lines with waste heat from the compressor of the gas turbine installation.

10. A method according to claim 8, further comprising:
discharging, from the waste heat steam generator, condensation occurring during said preheating of the waste heat steam generator.

11. A method according to claim 1, wherein preheating at least a portion of the gas turbine installation comprises:
preheating the steam turbine with waste heat from the compressor of the gas turbine installation.

12. A method according to claim 11, wherein preheating the steam turbine comprises preheating a housing and/or a rotor of the steam turbine.

13. A method according to claim 1, wherein preheating at least a portion of the gas turbine installation comprises at least one of preheating the steam turbine, keeping the steam turbine warm, sealing and evacuating the steam turbine, or combinations thereof.

14. A method according to claim 1, wherein, with the steam turbine sealed, pre-heating at least a portion of the gas turbine installation comprises exposing shaft glands with sealing steam.

* * * * *